United States Patent
Bertram et al.

(10) Patent No.: US 11,107,001 B1
(45) Date of Patent: *Aug. 31, 2021

(54) SYSTEMS AND METHODS FOR PRACTICAL AUTONOMY DECISION CONTROLLER

(71) Applicant: Rockwell Collins, Inc., Cedar Rapids, IA (US)

(72) Inventors: Joshua R. Bertram, Ames, IA (US); Angus L. McLean, Bradenton, FL (US); Alexander Roup, Centreville, VA (US); Ian McElhenny, Oviedo, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 92 days.

This patent is subject to a terminal disclaimer.

(21) Appl. No.: 16/143,126

(22) Filed: Sep. 26, 2018

(51) Int. Cl.
  *G06N 20/00* (2019.01)
  *G06N 5/02* (2006.01)
  *G05D 1/00* (2006.01)
  *G05D 1/08* (2006.01)
  *G05D 1/10* (2006.01)
  *B64C 39/02* (2006.01)

(52) U.S. Cl.
  CPC ........... *G06N 20/00* (2019.01); *B64C 39/024* (2013.01); *G05D 1/0088* (2013.01); *G05D 1/0816* (2013.01); *G05D 1/101* (2013.01); *G06N 5/022* (2013.01); *B64C 2201/141* (2013.01)

(58) Field of Classification Search
  CPC ...... G06N 20/00; G06N 5/022; G05D 1/0816; G05D 1/101; G05D 1/0088; B64C 39/024; B64C 2201/141
  See application file for complete search history.

(56) References Cited

U.S. PATENT DOCUMENTS

| | | |
|---|---|---|
| 6,360,193 B1 | 3/2002 | Stoyen |
| 7,330,844 B2 | 2/2008 | Stoyen |
| 2006/0225710 A1 | 10/2006 | Taglialatela-Scafati et al. |
| 2012/0004844 A1* | 1/2012 | Sahasrabudhe ........ G05D 1/027 701/300 |

(Continued)

OTHER PUBLICATIONS

Wikipedia, Machine Learning, 2018 (Year: 2018).*

(Continued)

*Primary Examiner* — Alan D Hutchinson
(74) *Attorney, Agent, or Firm* — Suiter Swantz pc llo

(57) ABSTRACT

A system includes a machine learning engine configured to receive training data including a plurality of input conditions associated with a state space and a plurality of response maneuvers associated with the state space and train a learning system using the training data and a reward function including a plurality of terms associated with a plurality of end state spaces, each term in the plurality of terms defines an end reward value for each end state space. A value function and policy are generated. The value function comprising a plurality of values, wherein each response maneuvers in the plurality of response maneuvers is associated with a value in the plurality of values related to transitioning from the state space to each end state space, the policy indicative of connections between the state spaces, plurality of values, and the respective end reward value for the plurality of end state spaces.

17 Claims, 5 Drawing Sheets

(56) References Cited

U.S. PATENT DOCUMENTS

2017/0369052 A1 12/2017 Nagy et al.
2019/0005828 A1* 1/2019 Costas ................... G05D 1/101

OTHER PUBLICATIONS

Corrected Notice of Allowance for U.S. Appl. No. 15/435,197 dated Jun. 22, 2018. 2 pages.
Gunsch et al, On Applying Machine Learning to Develop Air combat Simulation Agents, 4th Annual conferences an AI, simulation and Planning in High Autonomy Systems, IEEE, 1993, pp. 67-73.
Notice of Allowance for U.S. Appl. No. 15/435,197 dated Mar. 16, 2018. 8 pages.
Non-Final Office Action for U.S. Appl. No. 15/435,197 dated Oct. 24, 2017. 16 pages.

* cited by examiner

US 11,107,001 B1

SYSTEMS AND METHODS FOR PRACTICAL AUTONOMY DECISION CONTROLLER

BACKGROUND

The inventive concepts disclosed herein relate generally to the field of avionics systems. More particularly, embodiments of the inventive concepts disclosed herein relate to systems and methods for machine learning of pilot behavior, such as for operating autonomous vehicles and for use in live-virtual-constructive environments.

Autonomous vehicles, including unmanned aircraft, can perform maneuvers based on instructions that may be received from a remote human operator or, in the case of fully autonomous vehicles, instructions that are generated based on control laws that may be based on optimizing a particular objective. However, autonomous vehicles may not be able to receive instructions from a remote human operator at a conceptual level that is easy for the remote human operator to understand and thus communicate efficiently with the autonomous vehicle. Similarly, fully autonomous vehicles may generate instructions resulting in maneuvers that are inconsistent with expected pilot behavior, which may confuse other nearby vehicles or human operators working with the autonomous vehicles during training or testing exercises.

SUMMARY

In one aspect, the inventive concepts disclosed herein are directed to a system. The system includes a machine learning engine. The machine learning engine is configured to receive training data including a plurality of input conditions, each input condition in the plurality of input conditions associated with a state space and a plurality of response maneuvers associated with the state space. The machine learning engine is configured to train a learning system using the training data and a reward function including a plurality of terms associated with an end state space. The machine learning engine is configured to generate a value function and generate a policy, the value function comprising a plurality of values, wherein each response maneuvers in the plurality of response maneuvers is associated with a value in the plurality of values related to transitioning from the state space to the end state space, the policy effecting transitions from the state space to the end state space. Training the learning system includes providing the training data as an input to the learning system, the learning system configured to use the reward function to generate a value related to transitioning from each state space in the plurality of input conditions to the end state space.

In a further aspect, the inventive concepts disclosed herein are directed to an aircraft. The aircraft includes a sensory array, a neural network, and a control system. The sensory array is configured to receive a lead position of a lead aircraft relative to the aircraft and receive a lead orientation of the lead aircraft. The neural network is previously trained using training data and a reward function to generate a value function and a policy. The training data includes a plurality of input conditions, each input condition in the plurality of input conditions associated with a state space and a plurality of response maneuvers associated with the state space. The reward function includes a plurality of terms associated with a plurality of end state spaces, wherein each term in the plurality of terms defines an end reward value for each end state space in the plurality of end state spaces. The value function includes a plurality of values, wherein each value is associated with a response maneuver to transition from a state space to a second state space and each value corresponds to the end reward value for a given end state space in the plurality of end state spaces. The policy is indicative of connections between the state spaces, plurality of values, and the respective reward value for the plurality of end state spaces, wherein the neural network is configured to generate a set of commands responsive to the lead position and lead orientation. The control system is operably connected to the sensor array and the neural network. The control system configured to control operation of the aircraft responsive to the set of commands generated by the neural network.

In a further aspect, the inventive concepts disclosed herein are directed to a system. The system includes a machine learning engine. The machine learning engine is configured to receive training data including a plurality of input conditions, each input condition in the plurality of input conditions associated with a state space and a plurality of response maneuvers associated with the state space. The machine learning engine is configured to train a learning system using the training data and a reward function including a plurality of terms associated with a plurality of end state spaces, wherein each term in the plurality of terms defines an end reward value for each end state space in the plurality of end state spaces. The machine learning is configured to generate a value function and generate a policy, the value function comprising a plurality of values, wherein each response maneuvers in the plurality of response maneuvers is associated with a value in the plurality of values related to transitioning from the state space to each end state space, the policy indicative of connections between the state spaces, plurality of values, and the respective end reward value for the plurality of end state spaces.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
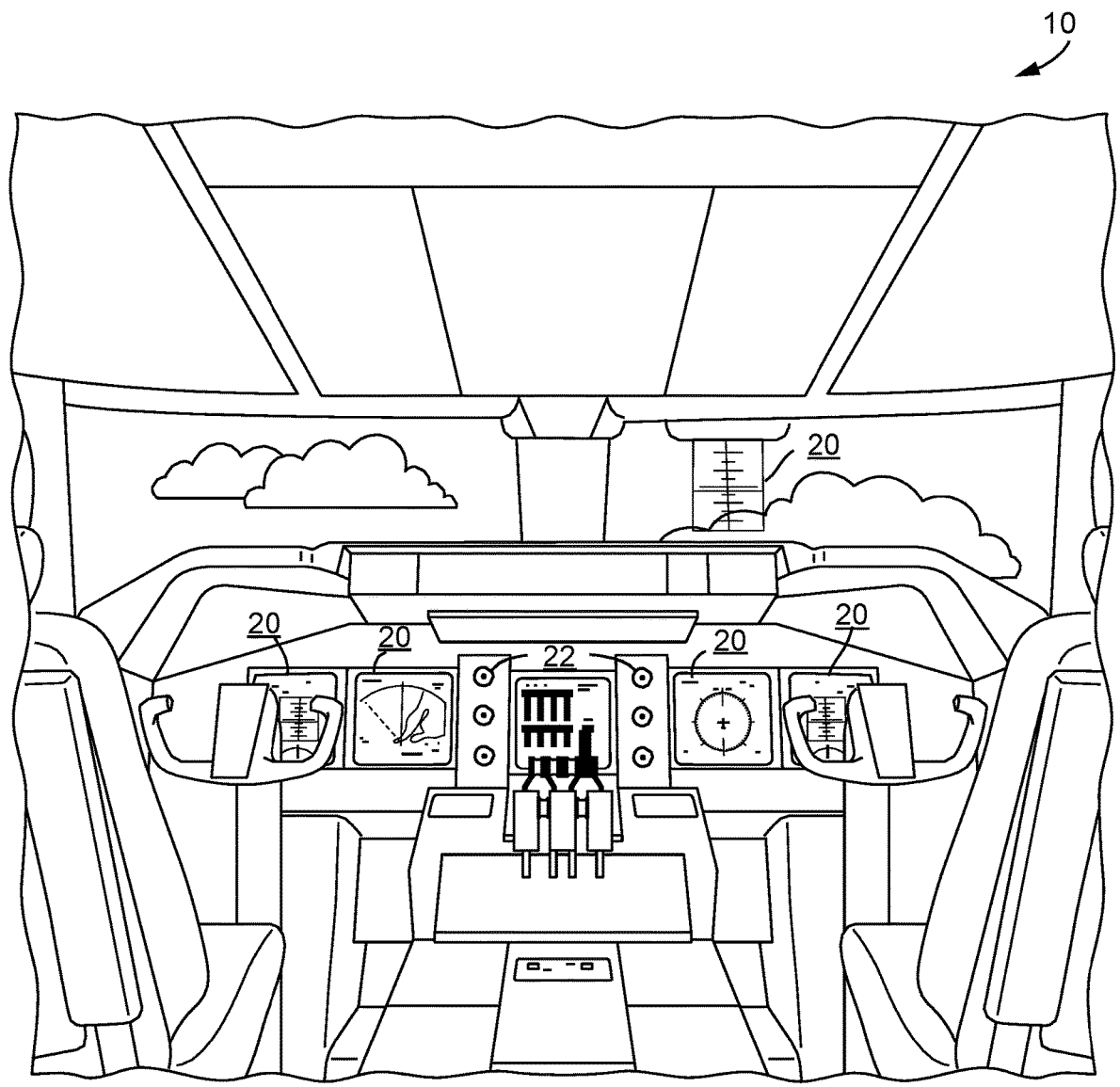
FIG. 1 is a schematic illustration of an exemplary embodiment of an aircraft control center according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for practical autonomy decision controller ("PADC"). Generally, the PADC or a PADC system utilizes a Markov decision processes ("MDP") engine that is provided first input conditions as a set or plurality of state spaces (e.g., a set or plurality of finite state spaces) and first response maneuvers as a set or plurality of actions (e.g., a set or plurality of finite actions). The MDP engine can determine the policy that best represents the relationship between the first input conditions and first response maneuvers. The inventive concepts disclosed herein can be utilized in a number of control systems for various types of electronic avionics applications for airborne platforms (e.g., aircraft), including but not limited to flight control and autopilot systems, navigation systems, flight display systems, communications systems, radar systems, electric power systems, engine control systems, and monitor warning systems. While the present disclosure describes systems and methods implementable for an airborne platform, the inventive concepts disclosed herein may be used in any type of application or environment (e.g., in another aircraft, a spacecraft, an autonomous vehicle, a ground-based vehicle, a water-based or underwater vehicle, a sub-surface or subterranean vehicle, a satellite, an aeronautical platform, or in a non-vehicle application such as a stationary communications, sensing, or testing system, a ground-based display system, an air traffic control system, a radar system, a virtual display system). The inventive concepts disclosed herein may be used for training, simulation, and testing exercises to be performed with autonomous vehicles, including during development of autonomous vehicles.

In some embodiments, a system includes a machine learning engine. The machine learning engine is configured to receive training data including a plurality of input conditions, each input condition in the plurality of input conditions associated with a state space and a plurality of response maneuvers associated with the state space. The machine learning engine is configured to train a learning system using the training data and a reward function including a plurality of terms associated with an end state space, the plurality of terms comprising positive traits associated with desirable state spaces in relation to the end state space and negative traits associated with undesirable state spaces in relation to the end state space. The machine learning engine is configured to generate a value function and generate a policy, the value function comprising a plurality of values, wherein each response maneuvers in the plurality of response maneuvers is associated with a value in the plurality of values related to transitioning from the state space to the end state space, the policy effecting transitions from the state space to the end state space. Training the learning system includes providing the training data as an input to the learning system, the learning system configured to use the reward function to generate a value related to transitioning from each state space in the plurality of input conditions to the end state space, wherein a higher value is indicative of a more desirable state space that has a higher end value at the end state space and wherein a lower value is indicative of a less desirable state space that has a lower end value at the end state space.

The system can be integrated with an airborne platform or other platform as described herein. For example, the system can be included in or communicatively coupled to an avionics system, navigation system, or autopilot system of the airborne platform, including for controlling operation of unmanned vehicles and autonomous vehicles.

In some embodiments, systems manufactured in accordance with the inventive concepts disclosed herein can improve the operation of autonomous vehicles by enabling a shared mental model of pilot behavior between human pilots and autonomous vehicles. For example, by training a learning system to learn how human pilots respond to various conditions, such as commands and flight conditions associated with positional relationships between aircraft, autonomous vehicles can be improved to perform flight maneuvers in a manner consistent with how human pilots would respond to such conditions. Unlike existing methods for maneuvering autonomous vehicles, such as by following a control law that optimizes a variable such as a distance from a leader aircraft at the expense of performing a maneuver that a human pilot would readily understand and be able to react to, the inventive concepts disclosed herein may allow autonomous vehicles to execute maneuvers (e.g., "follow the leader") which cannot be reduced to a control law while also performed in a manner than can be understood by a human pilot. Similarly, systems manufactured according to embodiments of the inventive concepts disclosed herein can enable autonomous vehicles to interact with human pilots and actors at a high level of sophistication unavailable to existing autopilot systems. In other words, the term "practical autonomy" refers to the replication of human-like behaviors, as the set of data used to train the systems is generated by, and embodies characteristics of, human pilots.

Referring to FIG. 1, a perspective view schematic illustration of an aircraft control center or cockpit 10 is shown accordingly to an exemplary embodiment of the inventive concepts disclosed herein. The aircraft control center 10 can be configured for an aircraft operator or other user to interact with avionics systems of an airborne platform. The aircraft control center 10 may include one or more flight displays 20 and one or more user interface ("UI") elements 22. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, watches, Google Glass®. The flight displays 20 may be used to provide information to the flight crew, thereby increasing visual range and enhancing decision-making abilities. One or more of the flight displays 20 may be configured to function as, for example, a primary flight display (PFD) used to display altitude, airspeed, vertical speed, and navigation and traffic collision avoidance system (TCAS) advisories. One or more of the flight displays 20 may also be configured to function as, for example, a multi-function display used to display navigation maps, weather radar, electronic charts, TCAS traffic, aircraft maintenance data and electronic checklists, manuals, and procedures. One or more of the flight displays 20 may also be configured to function as, for example, an engine indicating and crew-alerting system (EICAS) display used to display critical engine and system status data. Other types and functions of the flight displays 20 are contemplated as well. According to various exemplary embodiments of the inventive concepts disclosed herein, at least one of the flight displays 20 may be configured to display a visual representation of a widget generated according to the systems and methods of the inventive concepts disclosed herein.

In some embodiments, the flight displays 20 may provide an output based on data received from a system external to an aircraft, such as a ground-based weather radar system, satellite-based system, or from a system of another aircraft. In some embodiments, the flight displays 20 may provide an output from an onboard aircraft-based weather radar system, LIDAR system, infrared system or other system on an aircraft. For example, the flight displays 20 may include a weather display, a weather radar map, and a terrain display. In some embodiments, the flight displays 20 may provide an output based on a combination of data received from multiple external systems or from at least one external system and an onboard aircraft-based system. The flight displays 20 may include an electronic display or a synthetic vision system (SVS). For example, the flight displays 20 may include a display configured to display a two-dimensional (2-D) image, a three-dimensional (3-D) perspective image of terrain and/or weather information, or a four-dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft.

The UI elements 22 may include, for example, dials, switches, buttons, touch screens, keyboards, a mouse, joysticks, cursor control devices (CCDs), menus on Multi-Functional Displays (MFDs), or other multi-function key pads certified for use with avionics systems. The UI elements may be incorporated by the flight displays 20 (e.g., the UI elements 22 may appear on or be part of the flight displays 20). The UI elements 22 may be configured to, for example, allow an aircraft crew member to interact with various avionics applications and perform functions such as data entry, manipulation of navigation maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20. For example, the UI elements 22 may be used by aircraft crew members to adjust the brightness, contrast, and information displayed on the flight displays 20. The UI elements 22 may additionally be used to acknowledge or dismiss an indicator provided by the flight displays 20. The UI elements 22 may be used to correct errors on the flight displays 20. The UI elements 22 may also be used to adjust the radar antenna tilt, radar display gain, and to select vertical sweep azimuths. Other UI elements 22, such as indicator lights, displays, display elements, and audio alerting devices, may be configured to warn of potentially threatening conditions such as severe weather, terrain, and obstacles, such as potential collisions with other aircraft. In some embodiments, such as where an autonomous vehicle includes the cockpit 10, the cockpit 10 may be used to implement the autonomous vehicle as a piloted vehicle, or the autonomous vehicle components may be used as a backup system if the piloted portion of the vehicle is degraded or disabled. In some embodiments, such as for a hardware-in-the-loop test in which autonomous vehicle hardware is configured to display test information and receive inputs from a pilot or other user via components of the cockpit 10.

Figure 2A:
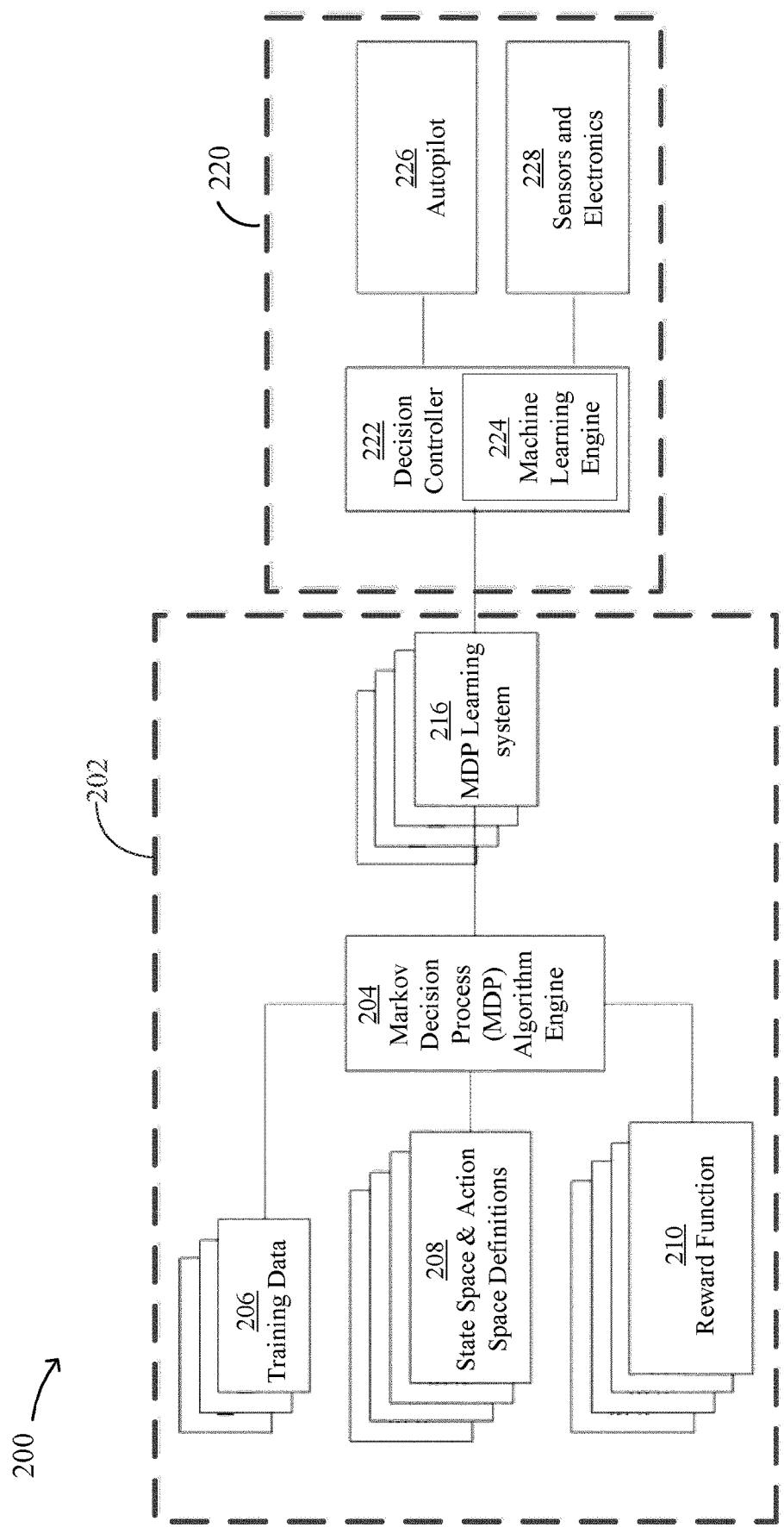
FIG. 2A is a block diagram of an exemplary embodiment of a system for machine learning of pilot behavior according to the inventive concepts disclosed herein.

Referring now to FIG. 2A, a schematic diagram of a PADC system 200 is shown according to an exemplary embodiment of the inventive concepts disclosed herein. The PADC system 200 includes a control circuit 220 and a training circuit 202. Some or all of the PADC system 200 can be implemented as part of a vehicle, an autonomous vehicle, or any other platform, such as an airborne platform incorporating features of the aircraft control center 10 of FIG. 1. For example, the training circuit 202 can be implemented and used to generate a trained machine learning engine that is included in the control circuit 220 and implemented in an autonomous vehicle. The PADC system 200 (or components thereof) can be implemented on a live platform, a simulation of a platform, a test exercise, or a hardware-in-the-loop application.

Generally, the control circuit 220 includes a machine learning engine 224 that is configured to control operation of the vehicle in response to an input condition, where the input condition may include at least one of a command received from a human pilot at a semantic level of understanding, a state of the vehicle, or a state or representation of an environment surrounding the vehicle. The control of the operation by the control circuit 220 may be a result of formulating one or more MDP algorithms (e.g., learning systems) using the machine learning engine 224. The MDPs execute a value function to determine a value associated with performing a given action from a given state. The control circuit 220 executes the machine learning engine 224 (e.g., an MDP algorithm received from MDP engine 204 and generated by training circuit 202) to calculate a value of an action based on a reward that can be expected from taking the action. In some embodiments, the control circuit 220 executes the MDP engine 204 using a reward function that may be at least partially user-generated, and that can be configured to generate higher values of the rewards for actions that lead to desirable state spaces (e.g., contains all of the information necessary to predict the effects of an action and to determine if it is a goal state) and maneuvers, and lower values of rewards for actions that lead to less and/or undesirable state spaces and maneuvers. In some embodiments, the MDPs are structured such that the value function and policy is learned by the machine learning engine 224.

Having the machine learning engine 224 learn from the MDPs and value functions can provide an improved approach to implementing machine learning engines and/or neural nets and overcomes limitations of common neural net approaches. Specifically, neural nets may be limited with how they deal with conflicting data points, may not learn from both good and bad data points, and may be short-term decision orientated. When presented with more training sets to learn from, there may be an increase in conflicting data points supplied, which causes the neural net to generate a response function directed to an average between the conflicting actions, rather than a response function that preferentially outputs appropriate or correct actions. For example, neural nets may receive conflicting data points that are each labeled as appropriate; this may be due to noise in the data points (such that the neural net may average the behavior represented by the noisy data points and, in effect, filter the data), or the input features represented by the data points not being detailed enough or not describing the state space sufficiently (e.g., aliasing), in which case the neural net may not have sufficient information to differentiate between conflicting data points. Detrimentally, this can cause a flat response as the more data points (e.g., more conflicting data points) are provided to the neural net. Relatedly, utilization of a neural net may require manual filtering of the input data so that conflicting data points are removed from the training set before training the neural net, as the neural net may not have an a priori model that can be used to filter the input data based on the quality of each data point. In addition, the neural net may be stateless, meaning that the neural net is unable to calculate a prediction of a future state, instead only using the current state to produce an output. Systems and methods in accordance with the present disclosure can use MDPs that can effectively generate outputs even where input data points are conflicting, and can look into the future to produce the best possible result to converge on the optimal path given a current state.

Referring further to FIG. 2A, the training circuit 202 includes a learning system that includes an MDP engine 204. As discussed above, the MDP engine 204 can generate one or more MDP algorithms that define a desired response to received input conditions, such as a response maneuver that should be performed given the input conditions in order to reach an intended end space/and or increase a value of an end space reached based on the performed response maneuver. The MDP engine 204 is configured to receive a plurality of training data 206, receive a plurality of state spaces and transition spaces 208, and execute a reward function 210 to generate an MDP learning system 216 and/or policies. The MDP engine 204 can generate the policy to indicate how a vehicle would behave while controlled by a human pilot in response to various input conditions. The MDP engine 204 can generate the policy to define transitions (e.g., actions) from a current state space to a subsequent state spaced based on the future implications of the immediate action. As such, the MDP engine 204 can generate the policy to represent a decision to transition from a current state space to a subsequent state space based on a short-term action (e.g., a single maneuver) that will eventually lead to an optimal (e.g., desirable, high value) long term result (e.g., state space reached by performing a plurality of maneuvers). Beneficially, the MDP engine 204 can be tunable to balance the importance of achieving an immediate reward versus achieving a long-term reward. For example, the MDP engine 204 can tune immediate versus long-term rewards by modifying a value of a discount factor used to discount rewards as a function of time. The MDP engine 204 can use the reward function 210 to tune the resulting behavior of the MDP learning system 216 by adjusting relative magnitudes of the parameters of the reward function 210 and/or adjusting The state space and transition space definitions 208 can provide context regarding the training data 206. Generally, the state spaces can include a state of a vehicle (e.g., position(s) and orientation(s)) and may include non-vehicle information such as a representation or state of an environment surrounding a vehicle, including behavior of other vehicles or platforms, and commands, instructions, or other communications received from other entities. The transition actions may represent a maneuver between a state space or through a series of entity state spaces over time. For example, the transition actions can represent positions and/or orientations over the course of a maneuver.

The state space definitions can include a plurality of first input conditions and the transition space definitions can include a plurality of first response maneuvers associated with the first input conditions. The state space can include at least one of a position, a velocity, an acceleration, or an orientation, for example, the state space can include a position and orientation of an airborne platform. Additionally, the state space can include at least one of absolute information or relative information, for example, the entity state can indicate that the vehicle is located at absolute GPS coordinates. The transition space definitions can comprise a mapping or representation of first response maneuvers to first input conditions. In some embodiments, more than one first input condition can be associated with a particular first response maneuver. For example, a particular maneuver may have been performed under (e.g., training data) or defined to be associated with (e.g., user-defined) a variety of first input conditions.

In some embodiments, the state space and transition space definitions 208 include a predetermined (or historical) first input condition and a predetermined (or historical) first response maneuver associated with the predetermined first input condition. For example, the first input condition may be stored as a first data point or set of data, and the first response maneuver stored as a second data point or set of data. For example, the predetermined plurality of first input conditions can indicate relative positions and relative orientations of a platform to a remote platform, such as a leader, and the predetermined plurality of first response maneuvers can indicate an angle of bank to choose to join up with the leader. In other embodiments, the state space and transition space definitions 208 define similarities between groups of first input conditions or between groups of first response maneuvers.

The training data 206 includes training data that was stored and/or captured based on control of a vehicle by a human pilot, such as from a simulation of controlling the vehicle or from real flight data. The training data 206 includes captured data of human flight that corresponds to the state spaces (e.g., input conditions) and transition actions (e.g., maneuvers) as defined by the state space and transition space definitions 208. The first input conditions can represent conditions of the training data 206 or user inputs which, when applied to a vehicle or when perceived by a pilot, lead to a particular response maneuver being performed. For example, the training data 206 could include actions that are defined by the state space and transition space definitions 208 as being indicative or related to a state of a vehicle, a representation or state of an environment surrounding a vehicle, including behavior of other vehicles or platforms, and commands, instructions, or other communications received from other entities.

The transition actions may represent control instructions received from a pilot over the course of a maneuver, such as control instructions received from control devices such as accelerators, brakes, steering wheels, yokes, or other control devices. In some embodiments, a plurality of first response maneuvers are based on transition actions from at least one of a simulation of piloting a vehicle, a control system of a vehicle, or a navigation system of a vehicle. As will be appreciated, the training data may be further contextualized and adjusted by the state space and transition space definitions 208 that are used by the MDP engine 204.

In some embodiments, the first input conditions and first response maneuvers may not be distinguished from one another when stored or when received as the training data. For example, training data 206 received based on control of the vehicle by a pilot may be a continuous string of position data, orientation data, and/or control data. The MDP engine 204 can be configured to parse the first input conditions and first response maneuvers from the training data, such as by executing a filter. The filter can be configured to distinguish first input conditions from first response maneuvers based on factors such as whether a command was received at the vehicle from a remote location, whether the vehicle performed a relatively abrupt maneuver such as an acceleration, turn, or deceleration, or whether the vehicle was changed from being controlled by an autopilot to being controlled manually. In some embodiments, training components such as the machine learning engine 224 or the decision controller 222 include enabling such components to learn how to generate human-like vehicle behavior by learning how human pilots respond to input conditions.

The reward function 210 includes a plurality of terms associated with subsequent state spaces and end state spaces. The training circuit 202 can use the reward function 210 to control and tune the MDP engine 204. The reward function 210 can be a cost function that applies high values or benefits to desirable (e.g., subjective to the user desired behavior of the PADC system 200) state spaces and maneuvers, and low values or penalties for undesirable state spaces and maneuvers. During training, the training circuit 202 uses the reward function 210 to calculate how much reward is obtained from a given state. For example, the training circuit 202 can use the reward function 210 to determine a high reward for having an aircraft wing in correct position for formation flight, but penalties for maneuvers to reach that end state space that have too high of a roll, cause an undesirable G force to the airframe, or result in too much altitude loss.

In some embodiments, the training circuit 202 extracts the reward function 210 from the training data 206. For example, the training circuit 202 can use, based on the training data 206, relatively high value runs by the human pilot to construct the higher reward/positive values and relatively low value runs by the human pilot to define the lower reward/negative values. The ability to add terms to the reward function 210 may strongly affect the resulting behavior of the PADC system 200. As will be appreciated, the same training data 206 and state space and transition space definitions 208 can be used with different reward functions 210 to obtain a different behavior (e.g., generated value function and policy) by the machine learning engine 224.

The MDP engine 204 is configured to receive the training data 206, the state space and transition space definitions 208, and the reward function 210, and generate a value function and converge on the optimal policy. The value function and the policy can be strongly correlated, as the value function measures how valuable an action and subsequent state are, and the policy drives the transition from a current state through subsequent states to a desired end state. For example, the MDP engine 204 can extract the policy from the value function. During run-time, the control circuit 220 can use the MDP engine 204 to work backward from high reward end states and derive value of an action from how much reward can be expected from taking the action generating the value function. The MDP engine 204 can examine the current state and use the value function to calculate which action is most valuable. If the MDP engine 204 is programmed to always take the most valuable action, then the policy will make decisions (e.g., maneuvers) to maximize the end state reward. For example, by altering the reward function 210 to prioritize short-term rewards over long-term rewards, the resulting value function and policy will be different from a reward function 210 that prioritizes long-term rewards over short-term rewards. In some embodiments, the MDP engine 204 is configured to prioritize the best immediate action to eventually lead to the best long-term result (e.g., most desirable end space for long-term reward). For example, the policy and value function may cause a current state to take an immediate action that, in the short term, is nominal, however, the immediate action has subsequent actions that lead to an end state that has the highest reward. Beneficially, the MDP engine 204 through the value function and policy can be forward looking and can identify the future implications of all actions from a given state with respect to the reward function 210.

In some embodiments, the MDP engine 204 at least one of (1) learns from samples of data of the system in operation (e.g., flight tracks) or (2) can use a reinforcement learning environment (e.g., simulation) to generate the value function and policy. The training circuit 202 can initially train the MDP engine 204 using good examples, and then can provide a value function and converge on the optimal policy that is associated with the good examples. As will be appreciated, the good examples will be good (e.g., have relatively high value) in accordance with the defined state spaces and transition space 208 and high/higher rewards in accordance with the reward function 210. As previously stated, the MDP engine 204 can learn from bad examples as well as good examples, or in other words, there is no requirement that all examples be good examples. By providing only good examples, the MDP engine is allowed to explore from the known-good example to further optimize rewards and may generate a more finely tuned value function and policy. In other embodiments, simulation data may be used in place of training data, thereby allowing the user to train the MDP engine 204 in flight scenarios that may not be available or captured by the human-pilot captured data. Beneficially, the combination of the two approaches can enable the training circuit 202 to use a strong base of knowledge to begin determining the value function and extracting the policy, while having the ability to determine value for actions outside of the captured training data 206.

The generated value function and policy form an MDP learning system 216, which can be outputted by the training circuit 202 for use by the control circuit 220 to determine, at run-time, response maneuvers that should be performed. In some embodiments, once an MDP learning system 216 (or, in some embodiments, the MDP engine 204) is trained, the application of the MDP learning system 216 is deterministic with respect to the state and transition space that is defined for the problem (e.g., input), such that the same action will always be taken from the same state space. Thus, with an appropriately defined state space, the MDP learning system 216 will then behave predictably. In some embodiments, the MDP learning system 216 includes a generated implicit set of commands that include the sequence of commands, their parameterization, and the context for which each of the commands would be appropriate.

The MDP learning system 216 may be operably connected to and/or implemented within the machine learning engine 224 of the control circuit 220. In some embodiments, the MDP learning system 216 includes one or more approximated value functions. While each state space and action combination can be stored in a table in memory, the stored values increase exponentially as more training data 206 is analyzed and more state spaces are assigned values. Accordingly, the value function can be approximated using a function regression analysis (e.g., least squares, linear regression, polynomial, etc.) or similar function approximation technique. In those embodiments, each state space and action combination is passed through the regression analysis and various algorithms are generated. Due to the convergence of the MDP engine 204, the various algorithms converge to a best-fit approximated value function that may be as close to the real value function for a given state space without the robust memory requirement of storing all state space and action combinations. Beneficially, the machine learning engine 224 excels at fitting incoming data to arbitrary, non-linear functions and is therefore well-suited to generating and approximating the value function and policy generated by the MDP engine 204.

In some embodiments, the machine learning engine 224 includes a representation of the MDP engine 204, thereby allowing the machine learning engine 224 to compare the output to the plurality of first response maneuvers, determine a difference between the output and the plurality of first response maneuvers, and modify the MDP learning system 216 based on the difference between the output and the plurality of first response maneuvers. For example, the plurality of first response maneuvers may represent a goal or objective that the machine learning engine 224 is configured to cause the MDP learning system 216 to match, by modifying characteristics and reward function 210 of the MDP engine 204 until the difference between the output and the plurality of first response maneuvers is less than a threshold difference. In some embodiments, training components such as the machine learning engine 224, the MDP learning system 216, or the decision controller 222 includes enabling such components to learn how to generate human-like vehicle behavior by learning how human pilots respond to input conditions.

The control circuit 220 can generate instructions, commands, or other information that can be used to control operation of a vehicle (or control systems of a vehicle). The control circuit 220 includes a machine learning engine 224 and a decision (e.g., maneuver) controller 222 that can control an autopilot 226 of an aircraft. The machine learning engine 224 is implemented with (e.g., trained by) one or more MDP learning system 216 based on historical training data associating input conditions with vehicle responses, such as maneuvers performed by the vehicle responsive to controls from a human pilot, and a set of reward and value conditions. As stated above, the MDP learning systems 216 formulate one or more value functions (or approximate value functions) and associated policies that dictate operation of the vehicle in response to an input condition, where the input condition may include at least one of a command received from a human pilot at a semantic level of understanding, a state of the vehicle, or a state or representation of an environment surrounding the vehicle from the sensors 228 and electronics 242.

In some embodiments, the control circuit 220 includes or is coupled to a supervisory controller. The supervisory controller can be configured to synthesize control instructions generated by the decision controller 222 with other controllers or information, such as a controller based on a control law, or information received from a navigation system or sensor system. By encoding response maneuvers at an appropriate level of semantic granularity, autonomous vehicles can be enabled to communicate with and receive commands from human pilots at a much higher level than in existing systems, such that autonomous vehicles and human pilots can have a shared mental model of vehicle behavior and control.

In some embodiments, the machine learning engine 224 is configured to train the decision controller 222 to generate a behavior model, such as a pilot behavior model, a semantic model, or a mental model, which can be shared with or readily understood by a human operator. For example, when trained, the decision controller 222 can be configured to receive commands at a semantic level of understanding from a human pilot. The semantic level of understanding may include high level or abstract commands, such as "maintain formation," "perform a roll out maneuver," or "land in that region." Based on the commands received at the semantic level of understanding, the decision controller 222 can determine an appropriate maneuver to perform to follow the command. The appropriate maneuver can be similar to a maneuver that would be performed by a human pilot under similar conditions or circumstances. In some embodiments, where the decision controller 222 is controlling a vehicle (e.g., through autopilot 226) in a real-world application such as live flight, the behavior of the vehicle may thus be readily understood by nearby human pilots. In some embodiments, where the decision controller 222 is controlling a vehicle in a testing, simulation, or development environment, the behavior of the vehicle may thus be readily understood to facilitate determine whether the vehicle is performing in a desired manner or demonstrating aberrant or faulty behavior.

Figure 2B:
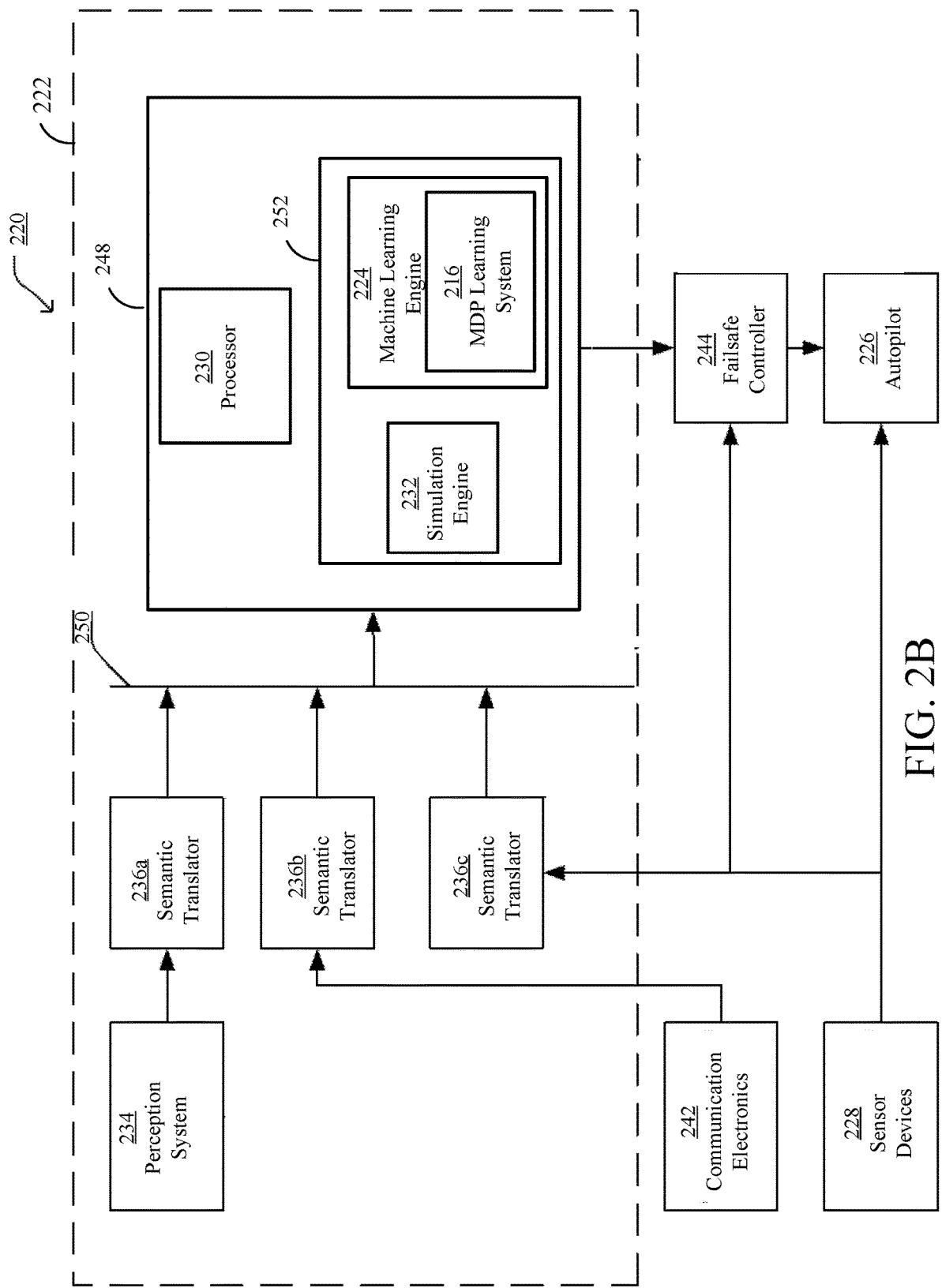
FIG. 2B is a block diagram illustrating implementation of an exemplary embodiment of a processing circuit for machine learning of pilot behavior according to the inventive concepts disclosed herein.

Referring now to FIG. 2B, an exemplary embodiment of the control circuit 220 according to the inventive concepts disclosed herein is implemented onto an aircraft and includes a MDP learning system 216. The control circuit 220 includes the decision controller 222, communication electronics 242, sensor devices 228, a failsafe controller 244 and an autopilot 226. As is readily apparent, the communication electronics 242 and sensor devices 228 provide inputs to the decision controller 222 that, in response to the inputs, directs the autopilot 226 to conduct a maneuver related to the output generated from the machine learning engine 224 and MDP learning system 216.

The communication electronics 242 can include transmitter electronics and receive electronics. The communication electronics 242 can include or be coupled to a datalink device. The communication electronics 242 can be configured to receive remote data, such as control instructions or indications of maneuver commands. The communication electronics 242 can be configured to transmit data regarding the PADC system 200, such as acknowledgements of control instructions, or information regarding a vehicle implementing the PADC system 200 or components thereof. The communication electronics 242 can be certified.

The sensor devices 228 can include one or more of an image capture device (e.g., a camera), an infrared sensor, a radar system, or a LIDAR system. The sensor devices 228 can be certified. The sensor devices 228 can output raw data including a plurality of pixels associated with a captured state of an environment within a sensor range of the sensor devices 228. For example, the sensor device 228 can capture a lead aircraft location and orientation or identify a maneuver by a trailing aircraft.

The communication electronics 242 and the sensor devices 228 can provide additional inputs and environment data (e.g., lead aircraft location and orientation, elevation, cloud coverage, wind speed, etc.) to the decision controller 222. For example, the communication electronics 242 and/or sensor devices 228 can capture an indication of a maneuver command or a visual command (e.g., inputs for a state space) from another aircraft. The indication of the maneuver command can include at least one of an audio command, a visual command, a text command, or a command received via a datalink. The visual command includes at least one of a hand gesture, a movement of a platform, or an electromagnetic transmission from a platform. As will be readily apparent, the decision controller 222 receives the inputs and generates commands to control position, velocity, acceleration, and/or heading of the aircraft via the autopilot 226. The commands could include a maneuver set that includes, but is not limited to, relative station-keeping, formation flight, and relative maneuvering. The term "relative station-keeping" refers to the maintenance of a relative position and orientation relationship with respect to the surrounding environment. The term "formation flight" refers to maintenance of a relative position and orientation relationship with respect to the lead aircraft. The term "relative maneuvering" refers to changing from one relative position and/or orientation to another relative position and/or orientation.

The decision controller 222 is shown in FIG. 2B as including a processing circuit 248, a perception system 234 and one or more sematic translators 236. The processing circuit 248 is shown according to an exemplary embodiment of the inventive concepts disclosed herein. The processing circuit 248 can be used to implement various embodiments of the inventive concepts disclosed herein, including features of the PADC system 200 described with reference to FIG. 2A. In some embodiments, the processing circuit 248 is configured to use a machine learning engine 224 to train an MDP learning system 216 or to enable a hardware-in-the-loop implementation using the machine learning engine 224, and MDP engine algorithm, and a simulation engine 232.

The perception system 234 can include or be coupled to sensor devices 228 such as image capture devices (e.g., cameras), infrared sensors, radar systems, or LIDAR systems. The perception system 234 can be configured to sample a state of a real world or real environment. In some embodiments, the perception system 234 is configured to receive a representation of the real world or real environment from the simulation engine 232 and sample the representation.

In some embodiments, the perception system 234 includes or is communicatively coupled to the simulation engine 232. The perception system 234 can compare the sampled state of the real world to a completeness constraint, such as to determine whether the sampled state provides sufficient information to inform the machine learning engine 224, decision controller 222, or other components of the PADC system 200 of attributes of the environment surrounding the corresponding platform. The completeness constraint can include parameters associated with sensor hardware implemented on or expected to be implemented on the vehicle. The perception system 234 can execute the simulation engine 232 to interpolate, extrapolate, or emulate gaps in the sampled state of the real world determined based on the comparison to the completeness constraint. In some embodiments, the control circuit 220 or perception system 234 can include one or more semantic translators 236. In those embodiments, the semantic translators can act as an intermediary between raw data and the machine learning engine 224 or the decision controller 222, by converting raw data (e.g., sensor data) to semantic data which can be understood as an input condition. The semantic translators 236 can be configured to translate sensor data to semantic data. For example, the sensor data may be received from the perception system 234 or sensor devices 228 as an image (IR, visible, ultraviolet) or capture of a radar or LIDAR detector. This may improve the computational efficiency of the PADC system 200.

The communication bus 250 can be configured to receive data from components such as the perception system 234, communication electronics 242, sensor devices 228, and semantic translators 236, and transmit the received data to the processing circuit 248. For example, the communication bus 250 can be configured to implement a communication protocol for converting the received data to an interface of the processing circuit 248. In some embodiments, the communication bus 250 is configured to convert the received data to according to a semantic interface of the processing circuit 248, such as an interface indicating a level of semantic abstraction at which the machine learning engine 224 or processing circuit 248 is configured to receive input conditions.

The processing circuit 248 (e.g., control circuit, processing electronics) can include a processor 230 and memory 252. The processor 230 may be implemented as a specific purpose processor, an application specific integrated circuit (ASIC), one or more field programmable gate arrays (FPGAs), a group of processing components, or other suitable electronic processing components. The memory 252 is one or more devices (e.g., RAM, ROM, flash memory, hard disk storage) for storing data and computer code for completing and facilitating the various user or client processes, layers, and modules described in the present disclosure. The memory 252 may be or include volatile memory or non-volatile memory and may include database components, object code components, script components, or any other type of information structure for supporting the various activities and information structures of the inventive concepts disclosed herein. The memory 252 is communicably connected to the processor 230 and includes computer code or instruction modules for executing one or more processes described herein. The memory 252 includes various circuits, software engines, and/or modules that cause the processor 230 to execute the systems and methods described herein. Electronic hardware similar to the processor 230 and memory 252 may also be used to implement various components not shown in FIG. 2B.

In some embodiments, the memory 252 includes the machine learning engine 224. As described above, the machine learning engine 224 has trained an MDP learning system 216 to generate one or more value functions (or an approximate value function) and policy. The machine learning engine 224 is configured to receive data (e.g., flight data) including a first input condition(s) from the communication electronics 242, sensor devices 228, or similar devices. The conditions can include a state of a vehicle, a representation or state of an environment surrounding a vehicle, including behavior of other vehicles or platforms, and commands, instructions, or other communications received from other entities. The first input condition can be received from at least one of an image capture device, a radar detector, or a navigation system. The first input condition can include a relative orientation based on at least one remote vehicle. The first input condition can represent conditions which, when applied to a vehicle or when perceived by a pilot, lead to a particular response maneuver being performed.

The machine learning engine 224 is configured to determine the maneuver command based on input conditions such as an entity state or behavior of other platforms received from the communication electronics 242, sensor devices 228, or similar devices. For example, rather than receiving an explicit maneuver command, the input conditions may indicate a distance of a follower platform from a lead platform. The machine learning engine 224 can be configured to output a response maneuver based on the input condition and the MDP learning system 216. For example, the machine learning engine 224 can use the MDP learning system 216 to learn (e.g., determine based on the transition of the state space to an end state space using the value function and policy) that the appropriate response maneuver when the lead platform is "too far" is to "accelerate to catch up according to a learned acceleration profile."

The processing circuit 248 would then provide a set of commands to the autopilot 226 to control the aircraft to achieve the various maneuvers and desired end state space. The set of commands would be indicative of the transition from the initial state space of the input to the end state space with the highest reward; the commands capture each intermediary action and subsequent state spaces on the path from the initial state space to the end state space. Unlike existing systems, which might implement a control law such as to maintain a distance from a lead platform (and which may result in vehicle behavior inconsistent with or lacking the sophistication of a vehicle controlled by a human pilot) the machine learning engine 224 trained with the MDP learning system 216 can generate a sophisticated response maneuver that may be far too complex to capture with a control law.

In some embodiments, an MDP engine 204 can be included in the decision controller 222 to allow for "on-the-fly" alterations to a reward function 210, and thereby altering the value function, policy, and resulting behavior of the autonomous aircraft. In some embodiments, the machine learning engine 224 includes a neural network. The neural network can include a plurality of layers each including one or more nodes, such as a first layer (e.g., an input layer), a second layer (e.g., an output layer), and one or more hidden layers. The neural network can include characteristics such weights and biases associated with computations that can be performed between nodes of layers. Specifically, the neural net can implement a wide variety of complex approximated value functions.

In some embodiments, the memory 252 includes a simulation engine 232. The simulation engine 232 is configured to generate a representation of an environment surrounding the vehicle (e.g., a live or simulated vehicle implementing components of the PADC system 200). The simulation engine 232 can generate the representation of the environment based on a model of the environment. The model of the environment may indicate geographic features such as terrain or buildings. The simulation engine 232 can generate the representation of the environment to include other platforms, including simulated platforms being controlled by a human operator or constructive platforms being controlled based on a model. While FIG. 2B illustrates the memory 252 as a single entity including the machine learning engine 224 and simulation engine 232, it will be appreciated that one or more components of the memory 252 may be distributed across one or more computer-based resources. For example, the machine learning engine 224 may be included in a first memory device located in a first platform, and the simulation engine 232 can be included in a second memory device located in a second platform. The simulation engine 232 can be configured to output sensor data representative of the environment in a format configured for reception by the machine learning engine 224, the decision controller 222, or a perception system 234.

The PADC system 200 can include a failsafe controller 244. The failsafe controller 244 is configured to receive control instructions from the control circuit 220 (e.g., control instructions generated by the decision controller 222), and compare the control instructions to a fault condition to determine whether there is a fault in the control instructions. If the failsafe controller 244 does not determine that there is a fault in the control instructions, then the failsafe controller can transmit the control instructions to an autopilot 226 or other controller configured to control operation of a platform, such as an autonomous vehicle. If the failsafe controller 244 does determine that there is a fault in the control instructions, then the failsafe controller 244 can transmit override instructions to the autopilot 226 to avoid faulty or unsafe operation.

The system can include the autopilot 226. The autopilot 226 can be configured to generate control commands for controlling operation of the vehicle based on instructions or commands received from the control circuit 220. For example, the control circuit 220 can be configured to output the second response maneuver to the autopilot 226 (via the failsafe controller 244) as control instructions conforming to an interface of the autopilot 226.

Figure 3:
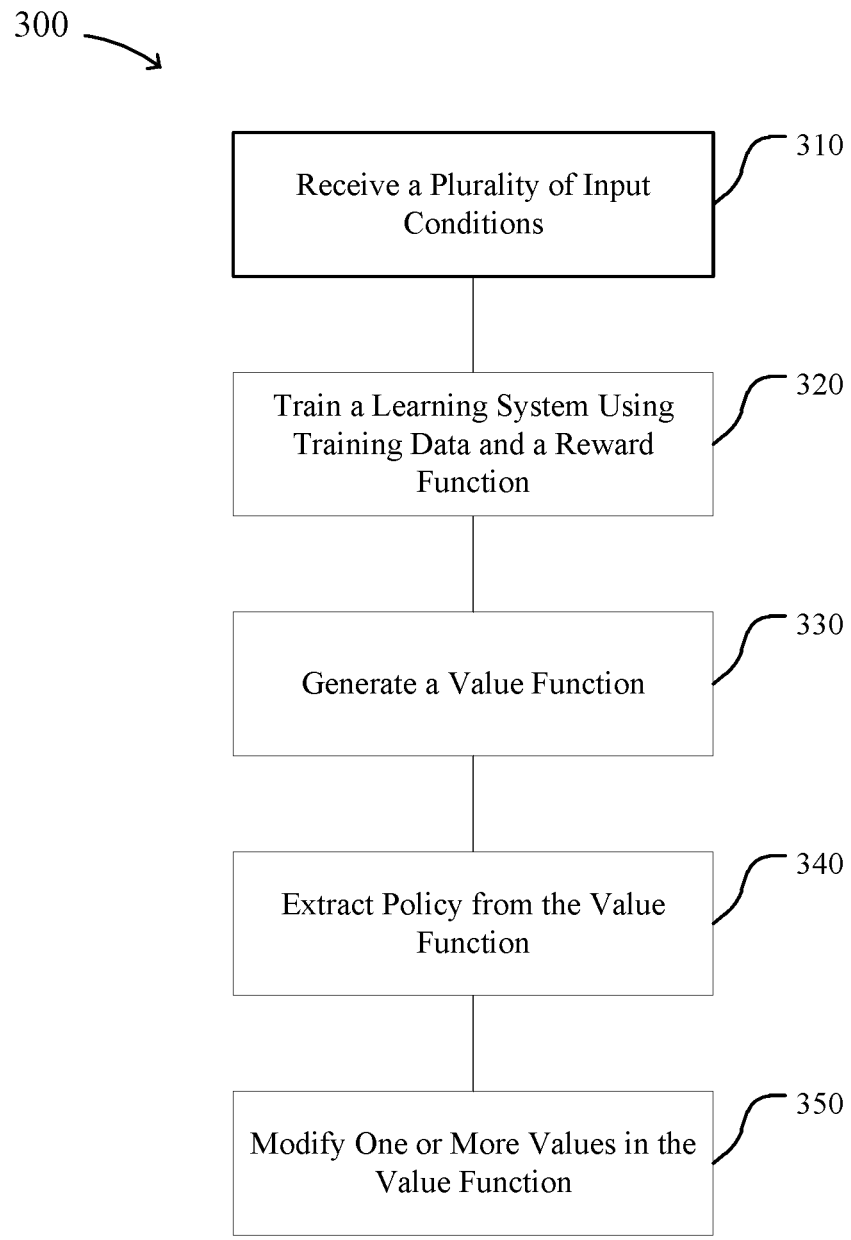
FIG. 3 is a diagram of an exemplary embodiment of a method according to the inventive concepts disclosed herein.

Referring now to FIG. 3, an exemplary embodiment of a method 300 according to the inventive concepts disclosed herein may include the following steps. The method 300 may be performed using various hardware, apparatuses, and systems disclosed herein, such as the aircraft control center 10, the PADC system 200, the processing circuit 248, and/or components thereof. The method 300 may use a neural net or machine learning engine to train an MDP learning system.

A step (310) may include receiving, by a machine learning engine, a plurality of input conditions. Each input condition in the plurality of input conditions is associated with a state space and a plurality of response maneuvers associated with the state space. The state space can include at least one of a position, a velocity, an acceleration, or an orientation. The plurality of response maneuvers can include at least one of a relative station-keeping, formation flight, relative maneuvering, and other aircraft actions to transition from the state space to a subsequent state space. The plurality of input conditions may be based on transition actions from at least one of a simulation of piloting a vehicle, a control system of a vehicle, or a navigation system of a vehicle.

A step (320) may include training a learning system using training data and a reward function including a plurality of terms associated with an end state space. The training data may be a plurality of transition actions may be recorded movement of a vehicle when controlled by a human pilot. The reward function may be a plurality of terms associated with subsequent state spaces and end state spaces. The reward function may be a type of cost function that applies high values or benefits to desirable (e.g., subjective to the user desired behavior of the PADC system 200) state spaces and maneuvers and low values or penalties for undesirable state spaces and maneuvers. During training, the reward function is used to calculate how much reward is obtained from transitioning from a given state space to another state space. The plurality of terms includes positive traits associated with desirable state spaces in relation to the end state space and negative traits associated with undesirable state spaces in relation to the end state space. In some embodiments, the reward function 210 is extracted from the training data 206 such that certain "good" runs by the human pilot are used to construct the higher reward/positive values and "bad" runs by the human pilot are used to define the lower reward/negative values.

A step (330) may include generating a value function. The value function includes a plurality of values that are related to the reward function and defined desirable and undesirable maneuvers and state spaces. The value is related to transitioning from each state space in the plurality of input conditions to an end state space, responsive to the long-term reward achieved at the end state space. Generally, a higher value is indicative of a more desirable state space that has a higher end value at the end state space and a lower value is indicative of a less desirable state space that has a lower end value at the end state space.

A step (340) may include extracting (e.g., generating) a policy from the value function. The step (340) may occur in tandem with step (330). The policy governs transitions (e.g., actions) from a current state space to a subsequent state spaced based on the future implications of the immediate action. The policy can define a decision to transition from a current state space to a subsequent state space governed by the short-term action that will eventually lead to the "best" (e.g., desirable) long term result (e.g., state space). Beneficially, the MDP engine 204 can be tunable, such as to balance the importance for achieving an immediate reward versus achieving a long-term reward using a discount factor.

A step (350) may include modifying one or more values during training the MDP learning system. The modification of the value can be indicative of a path that can provide more value in the short term and in the long term. The modification can include a maneuver that is different from a prior maneuver that was a combination with the given state space.

Figure 4:
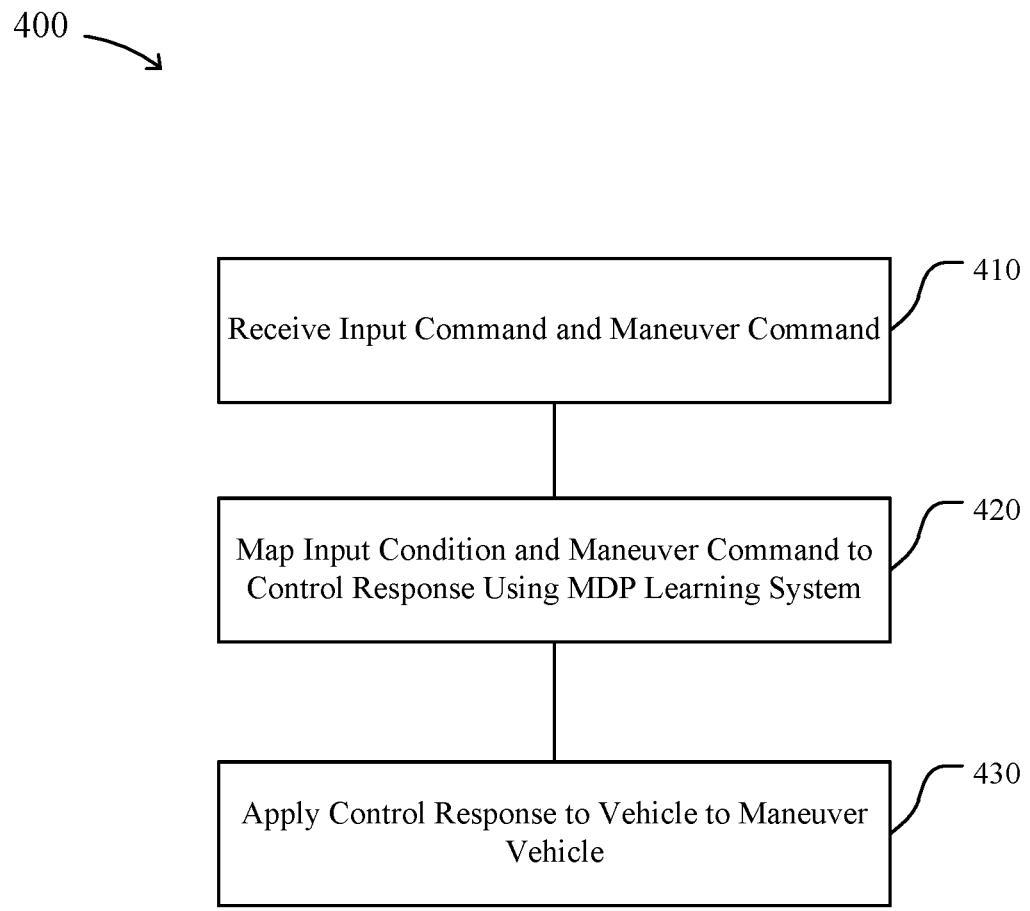
FIG. 4 is a diagram of an exemplary embodiment of another method according to the inventive concepts disclosed herein.

Referring now to FIG. 4, an exemplary embodiment of a method 400 according to the inventive concepts disclosed herein may include the following steps. The method 400 may be performed using various hardware, apparatuses, and systems disclosed herein, such as the aircraft control center 10, the PADC system 200, the processing circuit 248, and/or components thereof. The method 400 may be used to implement a neural net or machine learning engine that has trained an MDP learning system.

A step (410) may include receiving an input condition and receiving a control instruction indicating a maneuver command. The input condition can be received from at least one of an image capture device, a radar detector, or a navigation system. The input condition can include a relative orientation based on at least one remote vehicle.

A step (420) may include mapping the input condition and maneuver command to a control response using an MDP learning system. For example, the input condition and control instruction may be provided to a machine learning engine, or to a learning system trained by a machine learning engine. The machine learning engine can be configured to output the control response to represent a response maneuver based on the input condition and the MDP learning system. For example, the response maneuver can indicate control commands for control operation of a vehicle, such as controlling movement of the vehicle. The MDP learning system can be configured to be trained based on a plurality of predetermined input conditions and a plurality of predetermined response maneuvers associated with the plurality of predetermined input conditions as described above with respect to the training circuit 202 of FIG. 2A.

A step (430) may include applying the control response to the vehicle to maneuver the vehicle. A controller of the vehicle can control operation of the vehicle based on the response maneuver. For example, a control system or autopilot of the vehicle can be controlled to operate the vehicle based on the response maneuver. The vehicle can be controlled to follow a path of movement.

As will be appreciated from the above, systems and methods for an avionics graphics interface according to embodiments of the inventive concepts disclosed herein may improve operation of autonomous vehicles, including control systems and electronics of autonomous vehicles, by enabling autonomous vehicles to provide a shared mental model at a high level of semantic understanding to a human operator, and to perform maneuvers in a manner consistent with how a vehicle controlled by a human operator would behave.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A machine learning engine configured to:
receive training data including a plurality of input conditions and a plurality of response maneuvers, each input condition in the plurality of input conditions associated with a state space, each response maneuver in the plurality of response maneuvers associated with the state space;
extract a reward function from the received training data, the reward function including a plurality of terms associated with an end state space, the reward function at least partially user-generated;
train a learning system using the training data and the reward function;
generate a value function; and
generate a policy by extracting the policy from the generated value function,
the value function comprising a plurality of values, wherein each response maneuver in the plurality of response maneuvers is associated with a value in the plurality of values related to transitioning from the state space to the end state space, the plurality of terms including positive traits associated with desirable state spaces in relation to the end state space and negative traits associated with undesirable state spaces in relation to the end state space, wherein a higher value is indicative of a more desirable state space that has a higher end value at the end state space and wherein a lower value is indicative of a less desirable state space that has a lower end value at the end state space,
the policy effecting transitions from the state space to the end state space, and
wherein training the learning system includes:
providing the training data as an input to the learning system, the learning system configured to use the reward function to generate a value related to transitioning from each state space in the plurality of input conditions to the end state space.

2. The machine learning engine of claim 1, wherein training the learning system further includes:
modifying the value related to transitioning from each state space in the plurality of input conditions to the end state space, the modification responsive to identifying a transition value of a next response maneuver from a given state space for each response maneuvers in the plurality of response maneuvers associated with the state space,
the transition value associated with the plurality of terms and the end state space.

3. The machine learning engine of claim 2, wherein a greater reward value of the end state space results in a greater transition value from the given state space to the next responsive maneuver.

4. The machine learning engine of claim 2, wherein training the learning system further includes:
generating a value function approximation function indicative of a relationship between each state space and determined value for each response maneuvers from the state space.

5. The machine learning engine of claim 1, wherein the policy is configured to cause an immediate action from the state space that will eventually result in the end state space with the greatest end value, the immediate action comprising transitioning from the state space to a second state space by initiating a response maneuver in the plurality of response maneuvers.

6. The machine learning engine of claim 1, wherein the policy causes a transition from a first state space to a second state space, the transition indicative of the second state space being connected to the higher end value at the end state space.

7. The machine learning engine of claim 1, wherein the learning system includes a Markov decision process engine.

8. A system on an aircraft, comprising:
a sensor array configured to:
receive a lead position of a lead aircraft relative to the aircraft; and
receive a lead orientation of the lead aircraft;
a neural network previously trained using training data and a reward function to generate a value function and a policy,
the training data including a plurality of input conditions and a plurality of response maneuvers, each input condition in the plurality of input conditions associated with a state space, each response maneuver in the plurality of response maneuvers associated with the state space,
the reward function including a plurality of terms associated with a plurality of end state spaces, wherein each term in the plurality of terms defines an end reward value for each end state space in the plurality of end state spaces, the reward function at least partially user-generated,
the value function comprising a plurality of values, wherein each value is associated with a response maneuver to transition from a state space to a second state space and each value corresponds to the end reward value for a given end state space in the plurality of end state spaces;
the policy indicative of connections between the state spaces, plurality of values, and the respective reward value for the plurality of end state spaces,
wherein the neural network is configured to generate a set of commands responsive to the lead position and lead orientation,
the set of commands is determined by the policy, the policy causing a transition from a first state space corresponding to the lead position and the lead orientation to a first end state space having a highest end reward value, the set of commands indicative of aircraft movements that correspond to the transition from the first state space to the first end state space; and
a control system operably connected to the sensor array and the neural network, the control system configured to:
control operation of the aircraft responsive to the set of commands generated by the neural network.

9. The system of claim 8, wherein the set of commands comprises at least one of a sequence of commands, a parameterization of commands, and a context of commands, and wherein the set of commands corresponds to one of at least a relative maneuver, a stabilizing position, a stabilizing interaction, and a dynamic maneuver of the aircraft.

10. A machine learning engine configured to:
receive training data including a plurality of input conditions and a plurality of response maneuvers, each input condition in the plurality of input conditions associated with a state space, each response maneuver in the plurality of response maneuvers associated with the state space;
extract a reward function from the received training data, the reward function including a plurality of terms associated with an end state space, wherein each term in the plurality of terms defines an end reward value for each end state space in the plurality of end state spaces, the reward function at least partially user-generated;

train a learning system using the training data and the reward function;

generate a value function; and generate a policy by extracting the policy from the generated value function, the value function comprising a plurality of values, wherein each response maneuvers in the plurality of response maneuvers is associated with a value in the plurality of values related to transitioning from the state space to each end state space, the policy indicative of connections between the state spaces, plurality of values, and the respective end reward value for the plurality of end state spaces, the policy causes a transition from a first state space to a second state space, transition from the first state space to the second state space, the transition indicative of the second state space being connected to the end state space with the greatest end reward value.

11. The machine learning engine of claim 10, wherein training the learning system includes:

providing the training data as an input to the learning system, the learning system configured to use the reward function to generate a value related to transitioning from each state space in the plurality of input conditions to each end state space in the plurality of end state spaces, wherein the value is associated with the end reward value of each end state space with respect to the state space.

12. The machine learning engine of claim 11, wherein training the learning system further includes:

modifying the value related to transitioning from each state space in the plurality of input conditions to each end state space, the modification responsive to identifying a transition value of a next response maneuver from a given state space for each response maneuvers in the plurality of response maneuvers associated with the state space, the transition value associated with the plurality of terms and resulting end reward value of the end state space.

13. The machine learning engine of claim 12, wherein a greater end reward value of the end state space results in a greater transition value from the given state space to the next responsive maneuver.

14. The machine learning engine of claim 11, wherein training the learning system further includes:

generating a value function approximation function indicative of a relationship between each state space, the value for each response maneuvers from the state space, and the end reward value for each end state space.

15. The machine learning engine of claim 14, wherein the learning system is further configured to:

receive a first state space value, and transition to a second state space value responsive to a value generated with the value function approximation function, wherein the value of the second state space corresponds to a first end state space with a maximum end reward value.

16. The machine learning engine of claim 10, wherein the policy is configured to cause an immediate action from the state space that will eventually result in the end state space with the greatest end reward value, the immediate action comprising transitioning from the state space to the second state space by initiating a response maneuver in the plurality of response maneuvers.

17. The machine learning engine of claim 10, wherein the learning system is a Markov decision process engine.

* * * * *